(12) United States Patent
Lam et al.

(10) Patent No.: US 11,340,706 B2
(45) Date of Patent: May 24, 2022

(54) GESTURE RECOGNITION BASED ON DEPTH INFORMATION AND COMPUTER VISION

(71) Applicant: Zyetric Gaming Limited, Kowloon (HK)

(72) Inventors: Pak Kit Lam, Kowloon (HK); Peter Han Joo Chong, Kowloon (HK); Xiang Yu, Kowloon (HK)

(73) Assignee: Zyetric Gaming Limited, Kowloon (HK)

( * ) Notice: Subject to any disclaimer, the term of this patent is extended or adjusted under 35 U.S.C. 154(b) by 192 days.

(21) Appl. No.: 16/762,116

(22) PCT Filed: Nov. 13, 2018

(86) PCT No.: PCT/CN2018/115242
§ 371 (c)(1),
(2) Date: May 6, 2020

(87) PCT Pub. No.: WO2019/091491
PCT Pub. Date: May 16, 2019

(65) Prior Publication Data
US 2020/0356177 A1    Nov. 12, 2020

Related U.S. Application Data

(60) Provisional application No. 62/585,431, filed on Nov. 13, 2017.

(51) Int. Cl.
*G06K 9/00*        (2022.01)
*G06F 3/01*        (2006.01)
(Continued)

(52) U.S. Cl.
CPC ......... *G06F 3/017* (2013.01); *G06K 9/00214* (2013.01); *G06K 9/00355* (2013.01);
(Continued)

(58) Field of Classification Search
CPC ..... G06F 3/017; G06F 3/194; G06K 9/00355; G06K 9/00214; G06K 9/00389; G06K 9/6202
(Continued)

(56) References Cited

U.S. PATENT DOCUMENTS 9,129,155 B2 *   9/2015   Stoppa ................. G06K 9/4671
9,990,050 B2 *   6/2018   Zhang ................. G06K 9/00355
(Continued)

FOREIGN PATENT DOCUMENTS

| CN | 103679154 A | 3/2014 |
| CN | 103903011 A | 7/2014 |
| CN | 106503626 A | 3/2017 |

OTHER PUBLICATIONS

International Search Report and Written Opinion received for PCT Patent Application No. PCT/CN2018/115242, dated Feb. 12, 2019, 9 pages.

*Primary Examiner* — Gabriel I Garcia
(74) *Attorney, Agent, or Firm* — Morrison & Foerster LLP

(57) ABSTRACT

Systems and methods for gesture recognition based on depth information from a camera include, at an electronic device having a camera system, capturing a video frame and depth information associated with the video frame, identifying a foreground portion of the video frame based on the depth information, and determining whether the foreground portion matches a predefined gesture in a database. In accordance with a determination that the foreground portion matches a predefined gesture in the database, the device determines whether one or more subsequent video frames matches the one or more predefined gestures to produce a recognized gesture.

14 Claims, 6 Drawing Sheets

(51) Int. Cl.
*G06T 7/194* (2017.01)
*G06K 9/62* (2022.01)

(52) U.S. Cl.
CPC ....... *G06K 9/00389* (2013.01); *G06K 9/6202* (2013.01); *G06T 7/194* (2017.01)

(58) Field of Classification Search
USPC .................................................. 382/103, 154
See application file for complete search history.

(56) References Cited

U.S. PATENT DOCUMENTS

| | | | |
|---|---|---|---|
| 10,891,473 B2* | 1/2021 | Zhang | G06F 3/017 |
| 2013/0058565 A1 | 3/2013 | Rafii et al. | |
| 2016/0283768 A1* | 9/2016 | Kounavis | G06K 9/6215 |
| 2017/0068849 A1* | 3/2017 | Lim | G06K 9/6202 |

* cited by examiner

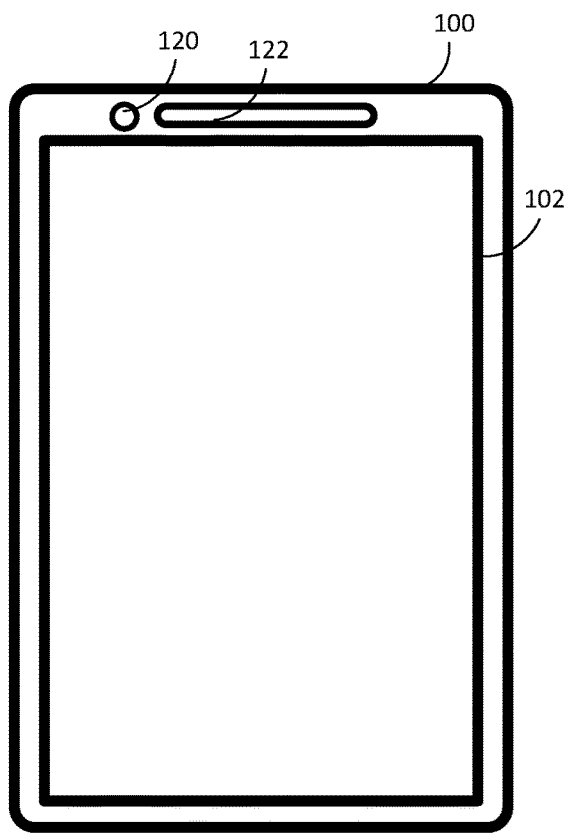 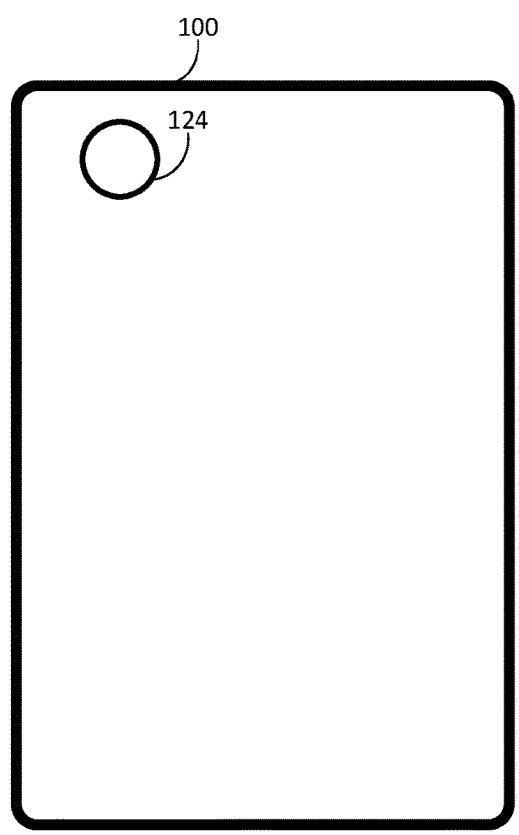
FIG. 1A                    FIG. 1B

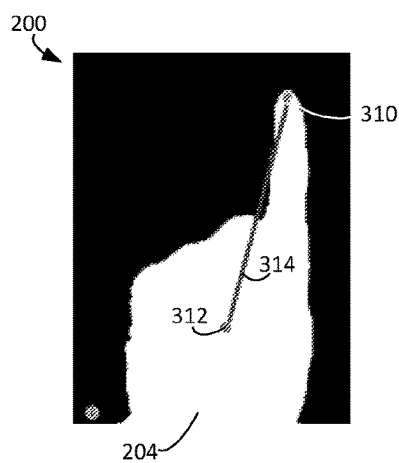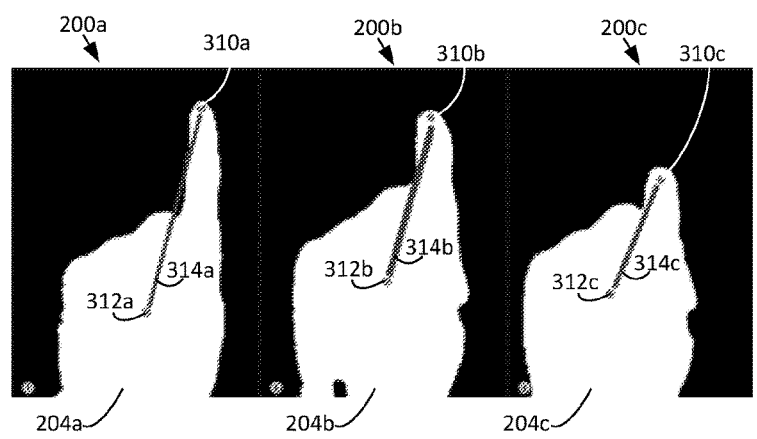
FIG. 3B
FIG. 3C

GESTURE RECOGNITION BASED ON DEPTH INFORMATION AND COMPUTER VISION

CROSS-REFERENCE TO RELATED APPLICATIONS

This application is a U.S. National Phase Patent Application under 35 U.S.C. § 371 of International Application No. PCT/CN2018/115242, filed Nov. 13, 2018, which claims priority to and the benefit of U.S. Provisional Patent Application Ser. No. 62/585,431, entitled "GESTURE RECOGNITION BASED ON DEPTH INFORMATION AND COMPUTER VISION," filed Nov. 13, 2017, each of which is incorporated herein by reference in its entirety.

FIELD

The present disclosure generally relates to computer vision, and more specifically, to computer vision for gesture recognition.

BACKGROUND

Computer vision techniques may be used for gesture recognition, such as recognizing a user's hand gestures. For example, computer-vision based gesture recognition may use color sensing to differentiate a user's hand from other objects within an image frame. In some cases, color sensing misses the user's hand when there is not enough contrast between the user's hand and other objects in the image frame.

SUMMARY

Below, various embodiments of the present invention are described to provide gesture recognition using depth information detected from a camera system and computer vision techniques.

In some embodiments, a method for gesture recognition based on depth information from a camera includes, at an electronic device having a camera system, capturing, at the camera system, a video frame and depth information associated with the video frame, identifying a foreground portion of the video frame based on the depth information, and modifying the video frame by altering a color mode of the foreground portion. The method includes determining whether the altered foreground portion matches one or more predefined gestures in a database, and in accordance with a determination that the altered foreground portion matches the one or more predefined gestures in the database, determining whether one or more subsequent video frames matches the one or more predefined gestures in the database to produce a recognized gesture.

In some examples, altering the color mode of the foreground portion further includes converting the foreground portion to gray scale. In some examples, modifying the video frame further includes eliminating a background portion of the video frame that is not included in the identified foreground portion of the video frame. Further, in some examples, identifying the foreground portion includes identifying pixels of the video frame that are within a threshold distance X based on the associated depth information. In some examples, the method includes identifying a background portion of the video frame by identifying pixels of the video frame that are not within a threshold distance X based on the associated depth information.

In some examples, the altered foreground portion includes an object being recognized, and the method further includes determining whether one or more features of the object being recognized matches one or more features of the one or more predefined gestures in the database. In some examples, the altered foreground portion matches the one or more predefined gestures in the database when a threshold of similarity between a feature of the object being recognized and a corresponding feature of the one or more predefined gestures is calculated. In some examples, the object being recognized is a user's hand, and the recognized gesture is a hand gesture. Further, in some examples, the one or more features of the object being recognized includes at least one of a depth of each pixel of the object being recognized, a contour, a convex hull point, and a geometrical carter of the object being recognized.

In some examples, determining whether the one or more subsequent video frames matches the one or more predefined gestures in the database to produce the recognized gesture further includes capturing, at the camera system, a second video frame and depth information associated with the subsequent video frame, identifying a foreground portion of the second video frame based on the depth information, modifying the second video frame by altering a color mode of the second foreground portion, and determining whether the recognized gesture is produced based on the altered foreground portion and the second altered foreground portion.

In some examples, the recognized gesture is produced when the altered foreground portion and the second altered foreground portion correspond to a sequence of predefined gestures in the gestures database In some embodiments, a computer readable storage medium stores one or more programs, and the one or more programs include instructions, which when executed by an electronic device with a camera system, cause the device to perform any of the methods described above and herein.

In some embodiments, an electronic device, includes a camera system, one or more processors, memory, and one or more programs, wherein the one or more programs are stored in the memory and configured to be executed by the one or more processors, the one or more programs including instructions for performing any of the methods of described above and herein.

In some embodiments, an electronic device includes a camera system and means for performing any of the methods described above and herein.

BRIEF DESCRIPTION OF THE FIGURES

The present application can be best understood by reference to the figures described below taken in conjunction with the accompanying drawing figures, in which like parts may be referred to by like numerals.

FIG. 1A depicts a front view of an example electronic device that implements various embodiments of the present invention FIG. 1B depicts a back view of an example electronic device that implements various embodiments of the present invention

FIG. 3B depicts an example of gesture recognition using depth information and computer vision techniques in accordance with various embodiments of the present invention.

FIG. 3C depicts another example of gesture recognition using depth information and computer vision techniques in accordance with various embodiments of the present invention.

DETAILED DESCRIPTION

Figure 2A:
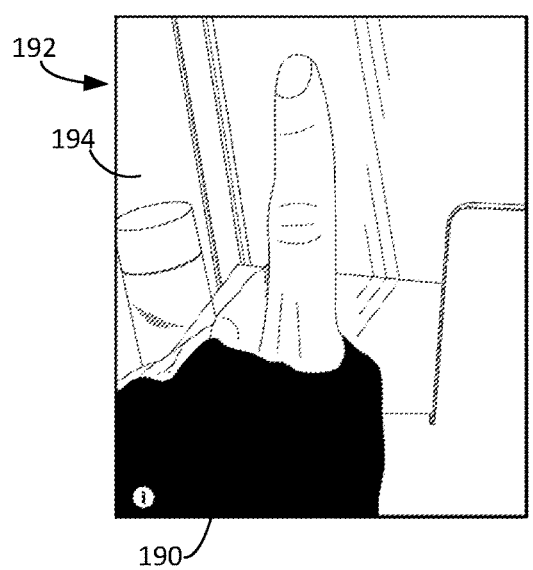
FIG. 2A depicts an example of gesture recognition that is not based on depth information.
Figure 2B:
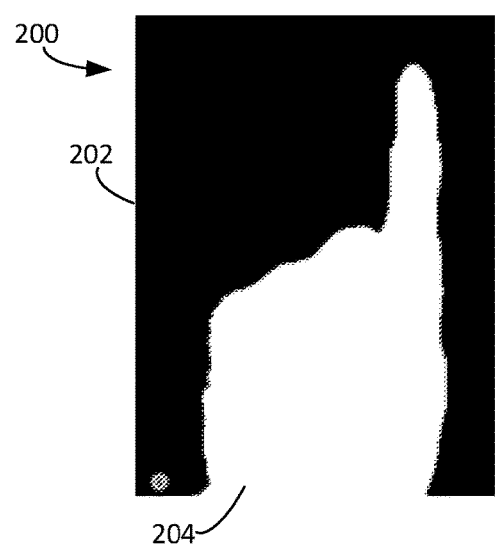
FIG. 2B depicts an example of gesture recognition that uses depth information and computer vision techniques in accordance with various embodiments of the present invention.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Referring to FIGS. 1A-1B, a front view and a back view, respectively, of smart device 100 which can be utilized to implement various embodiments of the present technology is shown. In some examples, smart device 100 is a smart phone or tablet computing device. However, it is noted that that the embodiments described herein are not limited to performance on a smart device, and can be implemented on other types of electronic devices, such as wearable devices, computers, or laptop computers.

As shown in FIG. 1A, a front side of the smart device 100 includes a display screen, such as a touch sensitive display 102, a speaker 122, and a front-facing camera 120. The touch-sensitive display 102 can detect user inputs received thereon, such as a number and/or location of finger contact (s) on the screen, contact duration, contact movement across the screen, contact coverage area, contact pressure, and so on. Such user inputs can generate various interactive effects and controls at the device 100. In some examples, the front-facing camera 120 faces the user and captures the user's movements, such as hand or facial images or movements, which are registered and analyzed for gesture recognition as described herein. The touch-sensitive display 102 and speaker 122 further promote user interaction with various programs at the device, such as by detecting user inputs while displaying visual effects on the display screen and/or while generating verbal communications or sound effects from the speaker 122.

FIG. 1B shows an example back view of the smart device 100 having a back-facing camera 124. In some examples, the back-facing camera 124 captures images of an environment or surrounding, such as a room or location that the user is in or observing. In some examples, smart device 100 shows such captured image data as a background to an augmented reality experience displayed on the display screen. In some examples, the back-facing camera 124 captures the user's movements, such as hand or facial images or movements, which are registered and analyzed for gesture recognition as described herein. Optionally, smart device 100 includes a variety of other sensors and/or input mechanisms to receive user and environmental inputs, such as microphones (which is optionally integrated with speaker 122), movement/orientation sensors (e.g., one or more accelerometers, gyroscopes, digital compasses), depth sensors (which are optionally part of front-facing camera 120 and/or back-facing camera 124), and so on. In some examples, smart device 100 is similar to and includes some or all of the components of computing system 500 described below in FIG. 5. In some examples, the present technology is performed at a smart device having image and depth sensors, such as a front-facing camera with depth-sensing capability (e.g., front-facing camera 120) and/or a back-facing camera with depth sensing capability (e.g., back-facing camera 124).

Various embodiments of the present invention provide systems and methods for gesture recognition based on depth information and computer vision. For instance, in some aspects of the present invention as discussed below, human gestures such as hand gestures can be recognized through computer processing techniques that utilize depth information captured from a camera system. By applying depth information with computer vision techniques, the disclosed gesture recognition techniques provide advantages over traditional methods which may be less accurate or reliable. For instance, with traditional methods, such as traditional methods that rely on color sensing, the background of a detected gesture must have enough contrasting color to the object that is intended for recognition in order to achieve relatively accurate results. Therefore, performance of traditional methods deteriorate as the complexity of backgrounds increase and/or level of contrasting color decreases.

For example, FIG. 2A shows a computer-vision gesture recognition technique that does not utilize depth information or depth sensing. In this approach, an algorithm (e.g., a color sensing algorithm) is implemented in attempt to extract an object being recognized ("OBR"), such as a user's hand 190, from the rest of the image frame 192. Such color sensing algorithms, particularly when used without depth sensing techniques, may fail to differentiate the user's hand 190 from the rest of the image frame 192 when the contrast of the background 194 and the user's hand 190 are below a certain level of contrast. As demonstrated at FIG. 2A, portions of the user's hand 190 that do not have a large enough contrast with other objects in the background 194 are missed.

On the other hand, gesture recognition based on depth information captured from the camera system, as disclosed herein, provides an improved method for recognizing gestures with high accuracy across a variety of situations. The depth information may be provided by a camera system installed on an electronic device, such as a camera installed on a mobile device or smart device. The depth information can be used to differentiate foreground objects, which may include the object being recognized ("OBR"), from the background and/or background objects regardless of how complex the background is. In this way, the disclosed gesture recognition based on depth information produces a much more accurate OBR in each image frame (also referred to herein as video frame) than the traditional color-based extraction methods as shown at FIG. 2A, particularly when the background is complex. In some examples as discussed below, multiple frames are analyzed together and recognized as a gesture, which may produce more accurate gesture recognition results. In an exemplary embodiment, the foreground object in the image frame is the OBR. It is contemplated that the disclosed depth sensing extraction techniques can be utilized alone, and/or in combination with color-based extraction methods, to provide improved gesture recognition and/or object extraction.

Turning now to FIGS. 2B and 3A-3C, example gesture recognition techniques based on depth information and computer vision (also referred to herein as gesture recognition based on depth, or "GRBD") are depicted, in accordance with various embodiments of the present invention. The GRBD captures video frames though the camera system capable of providing depth information, such as a camera on a smart device. For each frame captured, as shown at frame 200 of FIG. 2B, the GRBD eliminates a background portion 202 of the frame 200 according to the depth information given by the camera system, and converts a foreground portion or object 204 (e.g., user's hand) to gray scale. While FIG. 2 illustrates that the detected foreground object 204 is the OBR ("OBR 204"), it is contemplated that in some examples the foreground object 204 can include other objects in addition to the OBR. In some cases, the GRBD recognizes the additional objects and/or distinguishes such additional foreground objects from the OBR.

Figure 3A:
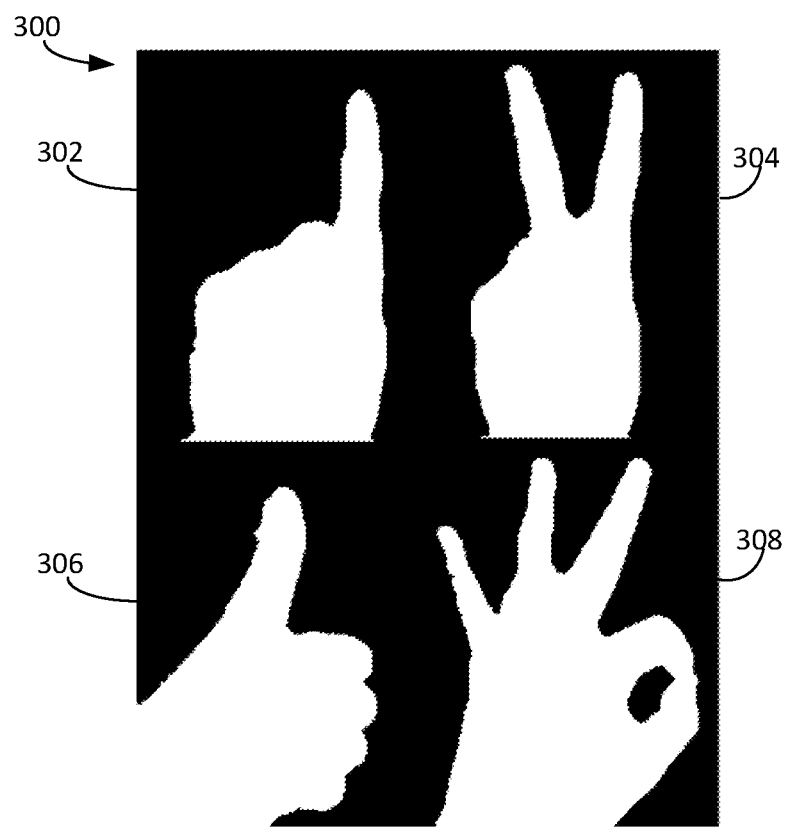
FIG. 3A depicts example pre-defined gestures in a database in accordance with various embodiments of the present invention.

Further, in some examples, the GRBD attempts to match the OBR 204 against one or more predetermined features of one or more pre-defined gestures in a database 300 of various pre-defined gestures 302, 304, 306, 308, as shown at FIG. 3A. The database 300 may be stored locally at the smart device implementing GRBD, and/or provided to the smart device through a network connection. The matching may include implementing various algorithms for calculating the similarity (or difference) between the features of the OBR 204 and pre-defined gestures in database 300. Such features may include, but are not limited to, the depth of each pixel, contours, convex hull points, and/or geometrical carter of the OBR 204. In some cases, a match is determined to be found when a threshold of similarity with one or more of the features is reached.

Further, in some examples, the database 300 is customizable by the user. For example, the pre-defined gestures stored in the database 300 can be selected by the user and/or defined based on the user's own hands and gestures during a set-up procedure, which may lend to increased accuracy in recognizing the same user's gestures during gesture recognition.

In some cases, upon determining that the match of the OBR to a pre-defined gesture in the database is found, a "recognition thread" may be created and implemented to provide continuous recognition of subsequent video frames behind the determined matched frame. The recognition thread may repeat similar steps as described above for the matched frame to determine whether one or more subsequent frames produce a match. For example, in the recognition thread, the GRBD may attempt to recognize the subsequent frames against one of the pre-defined gestures in the database 300, which is a series of frames, in the database, using a matching method similar to the above-described method to determine whether a gesture can be successfully recognized. As described above, analyzing multiple frames together to recognize a gesture may enhance accuracy of the recognition results. In some examples, if a gesture is recognized in the recognition thread, the GRBD is considered to be successful and returns a positive result, such as the recognized gesture. In some examples, if a gesture is not recognized in the recognition thread, such as no recognized gestures in the subsequent video frames after a pre-defined period of time or number of frames, the GRBD is considered to failed, and the recognition thread can be terminated, paused, interrupted, or otherwise stopped, which may conserve CPU power.

It is noted that the enhanced accuracy, for example by analyzing multiple frames together to recognize a gesture, allows the smart device to operate more efficiently, thereby preserving battery power throughout the operation, as well as decreasing the number of user inputs required for a gesture to be properly recognized. Further, in some examples, the recognition thread for subsequent frames is based on a subset of the pre-defined gestures in the database 300, the subset of pre-defined gestures corresponding to the initially matched gesture, which may further increase efficiency and decrease resources needed to determine whether a recognized gesture is produced.

Merely by way of example, referring back to FIG. 2B, an electronic device, such as a smart phone (e.g., smart device 100 at FIGS. 1A-1B) having a camera system capable of providing depth information of each pixel, is used for capturing a hand, gesture, or object being recognized, such as OBR 204. According to the depth information provided by the camera system, pixels that are a threshold X meters beyond the camera, where X is a threshold of the distance between the OBR from the background, are eliminated, and pixels that are within the threshold X meters from the camera are converted to a white color. The device can implement computer vision algorithms to match a shape of the OBR 204 of FIG. 2B to a pre-defined shape 302, 304, 306, 308, as shown at FIG. 3A.

In some examples, as illustrated at FIG. 3B, the computer vision algorithm finds a furthest convex hull point 310 of OBR 204, which is the point of the user's index finger and a geometrical carter 312, and calculates a length 314 between the two points 310, 312. As shown in FIG. 3C, the length 314a-b between the two points 310a-b and 312a-c, respectively, will continue to be calculated for the gestures or OBRs 204a-c in the next few frames 200a-b. If the length changes across the frames, and/or matches to a specific value, such as a value corresponding to a pre-defined gesture feature in the database 300, a gesture is considered to be recognized. In the illustrated example at FIG. 3C, a "clicking" gesture is recognized.

Other examples can be contemplated. For instance, in some examples, GRBD determines that the initial frame containing a foreground object matches a pre-defined gesture in the database and initiates the recognition thread for subsequent frames. In some examples, GRBD determines that the same OBR is maintained throughout the subsequent frames for a predetermined number of frames or a predetermined period of time before the OBR changes. For instance, the user maintains the same gesture throughout the recognition thread such that the initial and subsequent frames are very similar or the same. In some cases, such similarity is determined to produce a recognized gesture.

Further, in some examples, GRBD determines that the lines defining the lengths 314a-c in FIG. 3C have rotated or otherwise tilted throughout the subsequent frames and determines that a recognized gesture is produced. For example, the lengths 314a-c each define an angle between a vertical axis of the image frame and the GRBD determines that the angle increases or otherwise decreases, by a predetermined amount, across the subsequent frames, such as a predetermined number of subsequent frames for a predetermined period of time.

Still, in some examples, GRBD determines that the foreground object being recognized across subsequent frames include depth information indicating that the object has varied in depth from the camera system and determines whether the variation in depth corresponds to a known variation that produces a recognized gesture. For example, the user has moved his or her hand (or portions thereof) further away, closer, and/or other pattern from the camera system.

It is noted that in response to determining that a recognized gesture is produced, the device generates an interactive effect or other feedback to the user. Such effects or feedback can be dependent on an application (e.g., a gaming application, virtual or augmented reality environment) running on the smart device that is utilizing the gesture recognition. Additionally, determining the recognized gesture can be based on a combination of various similarities, differences, or other recognized features of the frames.

Figure 4:
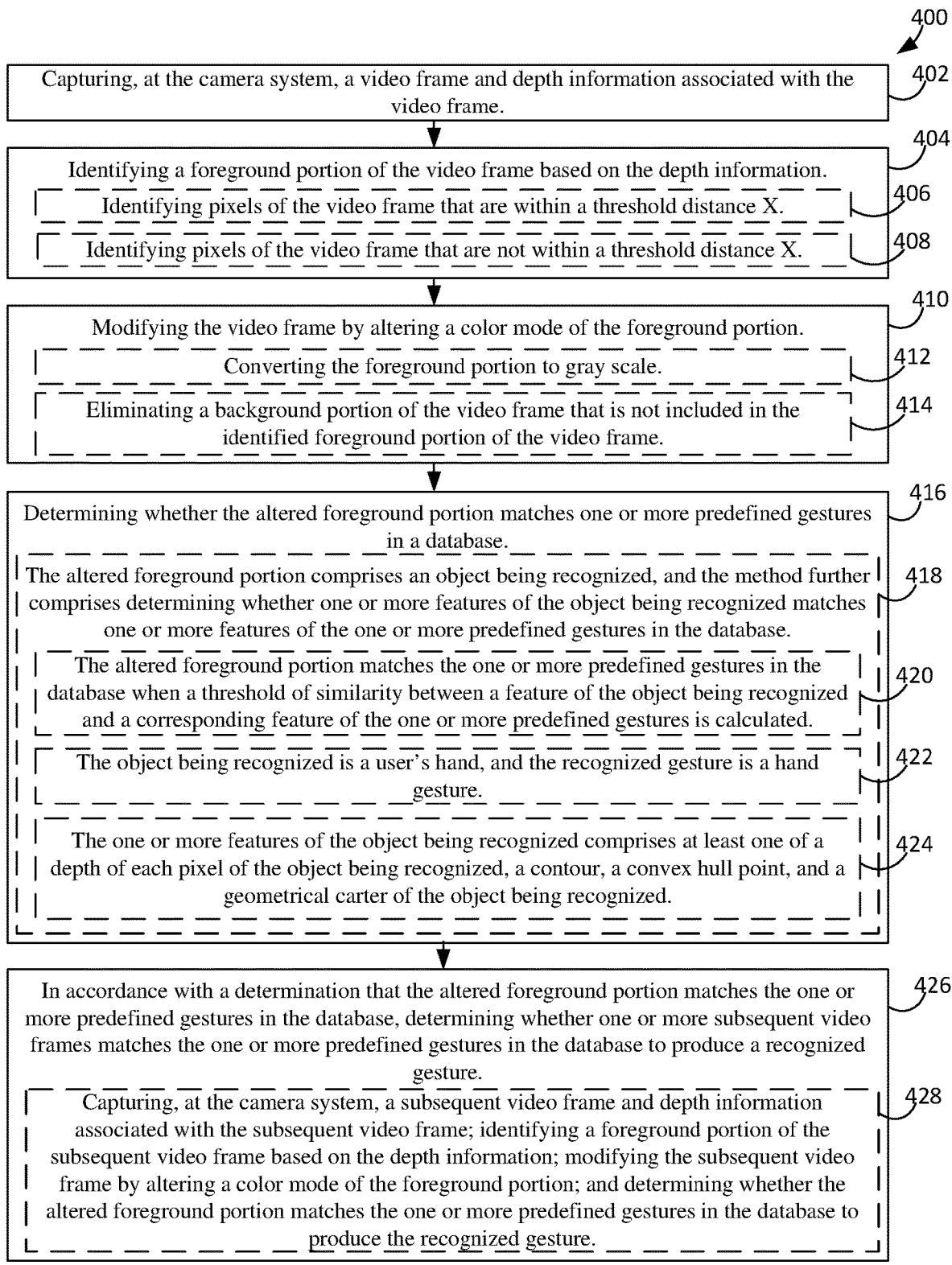
FIG. 4 depicts an example method for providing gesture recognition using depth information and computer vision techniques in accordance with various embodiments of the present invention.

Turning now to FIG. 4, an example method 400 is shown for providing gesture recognition based on depth information and computer vision, as illustrated in the various examples described above. The method 400 may be performed at an electronic device (e.g., smart device 100) having a camera system capable of obtaining depth information (e.g., front-facing camera 120, back-facing camera 124) such as a portable smart device having a camera. As shown at FIG. 4, method 400 includes capturing, at the camera system, a video frame and depth information associated with the video frame (block 402).

Method 400 includes identifying a foreground portion of the video frame based on the depth information (block 404). In some examples, identifying the foreground portion includes identifying pixels of the video frame that are within a threshold distance X based on the associated depth information (block 406). In some examples, method 400 includes identifying a background portion of the video frame by identifying pixels of the video frame that are not within a threshold distance X based on the associated depth information (block 408).

Method 400 includes modifying the video frame (e.g., frame 200 at FIG. 2B) by altering a color mode of the foreground portion (e.g., OBR 204 at FIG. 2B) (block 410). In some examples, altering the color mode of the foreground portion further comprises converting the foreground portion (e.g., OBR 204 at FIG. 2B) to gray scale (block 412). In some examples, modifying the video frame (e.g., frame 200 at FIG. 2B) further comprises eliminating a background portion of the video frame that is not included in the identified foreground portion (e.g., OBR 204 at FIG. 2B) of the video frame (block 414).

Method 400 includes determining whether the altered foreground portion (e.g., OBR 204 at FIG. 2B) matches one or more predefined gestures (e.g., gestures 302, 304, 306, 308 at FIG. 3A) in a database (e.g., database 300 at FIG. 3A) (block 416). In some examples, the altered foreground portion (e.g., OBR 204 at FIG. 2B) comprises an object being recognized (e.g., OBR 204 at FIG. FIG. 2B), and method 400 further comprises determining whether one or more features of the object being recognized matches one or more features of the one or more predefined gestures (e.g., gestures 302, 304, 306, 308 at FIG. 3A) in the database (e.g., database 300 at FIG. 3A) (block 418). In some examples, the altered foreground portion (e.g., OBR 204 at FIG. FIG. 2B) matches the one or more predefined gestures (e.g., gesture 302 at FIG. 3A) in the database (e.g., database 300 at FIG. 3A) when a threshold of similarity between a feature of the object being recognized and a corresponding feature of the one or more predefined gestures is calculated (block 420). In some examples, the object being recognized is a user's hand (e.g., FIGS. 2B, 3A-3C), and the recognized gesture is a hand gesture (e.g., FIG. 3A-3C) (block 422). Further, in some examples, the one or more features of the object being recognized (e.g., OBR 204 at FIG. 2B) comprises at least one of a depth of each pixel of the object being recognized, a contour, a convex hull point, and a geometrical carter of the object being recognized (e.g., FIGS. 3B-3C) (block 424).

Method 400 includes, in accordance with a determination that the altered foreground portion (e.g., OBR 204 at FIG. 3B) matches the one or more predefined gestures (e.g., gesture 302 at FIG. 3A) in the database (e.g., database 300 at FIG. 3A), determining whether one or more subsequent video frames (e.g., frames 200a-200c at FIG. 3C) matches the one or more predefined gestures (e.g., gesture 302 and/or gestures 304, 306, and 308 at FIG. 3A) in the database (e.g., database 300 at FIG. 3A) to produce a recognized gesture (block 426). In some examples, determining whether the one or more subsequent video frames (e.g., frames 200a-c at FIG. 3C) matches the one or more predefined gestures in the database (e.g., database 300 at FIG. 3A) to produce the recognized gesture further comprises includes capturing, at the camera system, a subsequent video frame and depth information associated with the subsequent video frame; identifying a foreground portion of the subsequent video frame (e.g., 204a-204c at FIG. 3C) based on the depth information, modifying the subsequent video frame by altering a color mode of the foreground portion, and determining whether the altered foreground portion matches the one or more predefined gestures in the database (e.g., database 300 at FIG. 3A) to produce the recognized gesture (block 428). Still, in some examples, method 400 includes, in accordance with a determination that the altered foreground portion does not match the one or more predefined gestures in the database (e.g., database 300 at FIG. 3A), forgoing determining whether one or more subsequent video frames matches the one or more predefined gestures in the database (e.g., database 300 at FIG. 3A) to produce a recognized gesture.

Figure 5:
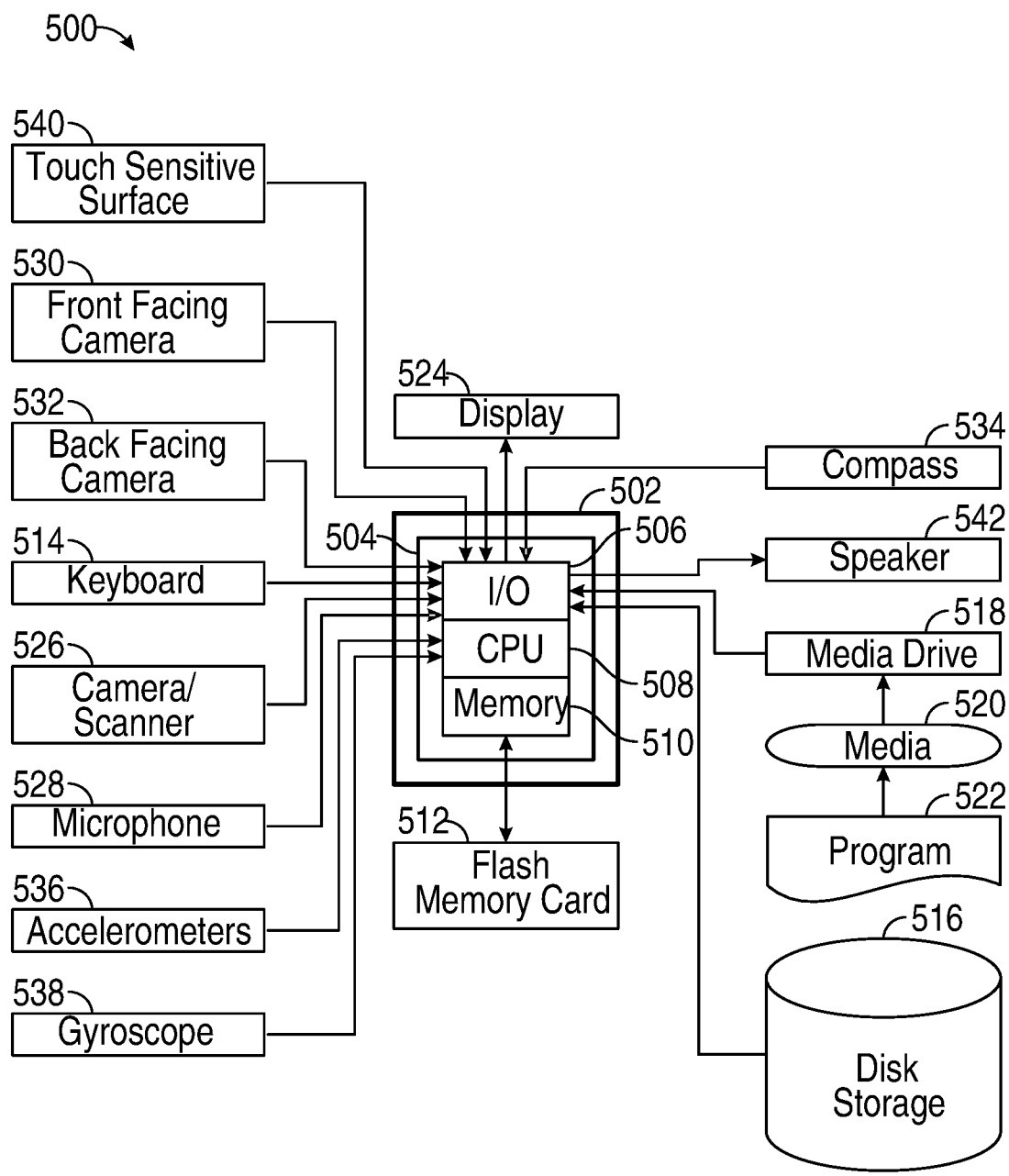
FIG. 5 depicts a computer system, such as a smart device, that may be used to implement various embodiments of the present invention.

Turning now to FIG. 5, components of an exemplary computing system 500, configured to perform any of the above-described processes and/or operations are depicted. For example, computing system 500 may be used to implement the smart device described above that implements any combination of the above embodiments. Computing system 500 may include, for example, a processor, memory, storage, and input/output peripherals (e.g., display, keyboard, stylus, drawing device, disk drive, Internet connection, camera/scanner, microphone, speaker, etc.). However, computing system 500 may include circuitry or other specialized hardware for carrying out some or all aspects of the processes.

In computing system 500, the main system 502 may include a motherboard 504 with a bus that connects an input/output (I/O) section 506, one or more microprocessors 508, and a memory section 510, which may have a flash memory card 512 related to it. Memory section 510 may contain computer-executable instructions and/or data for carrying out the techniques and algorithms described above. The I/O section 506 may be connected to display 524, a keyboard 514, a camera/scanner 526 (e.g., to detect objects for recognition, depth information, and capture video/image frames), a microphone 528, a speaker 542, a disk storage unit 516, and a media drive unit 518. The media drive unit 518 can read/write a non-transitory computer-readable storage medium 520, which can contain programs 522 and/or data used to implement process 200 and/or process 400.

Additionally, a non-transitory computer-readable storage medium can be used to store (e.g., tangibly embody) one or more computer programs for performing any one of the above-described processes by means of a computer. The computer program may be written, for example, in a general-purpose programming language (e.g., Pascal, C, C++, Java, or the like) or some specialized application-specific language.

Computing system 500 may include various sensors, such as front facing camera 530, back facing camera 532, compass 534, accelerometer 536, gyroscope 538, and/or touch-sensitive surface 540. Other sensors may also be included.

While the various components of computing system 500 are depicted as separate in FIG. 5, various components may be combined together. For example, display 524 and touch sensitive surface 540 may be combined together into a touch-sensitive display.

Exemplary methods, non-transitory computer-readable storage media, systems, and electronic devices are set out in example implementations of the following items:

Item 1. A method for gesture recognition based on depth information from a camera, comprising:
at an electronic device having a camera system:
capturing, at the camera system, a video frame and depth information associated with the video frame;
identifying a foreground portion of the video frame based on the depth information;
modifying the video frame by altering a color mode of the foreground portion;
determining whether the altered foreground portion matches one or more predefined gestures in a database; and
in accordance with a determination that the altered foreground portion matches the one or more predefined gestures in the database, determining whether one or more subsequent video frames matches the one or more predefined gestures in the database to produce a recognized gesture.

Item 2. The method of item 1, wherein altering the color mode of the foreground portion further comprises converting the foreground portion to gray scale.

Item 3. The method of any of items 1-2, wherein modifying the video frame further comprises eliminating a background portion of the video frame that is not included in the identified foreground portion of the video frame.

Item 4. The method of any of items 1-3, further wherein identifying the foreground portion comprises identifying pixels of the video frame that are within a threshold distance X based on the associated depth information.

Item 5. The method of any of items 1-4, further comprising:
identifying a background portion of the video frame by identifying pixels of the video frame that are not within a threshold distance X based on the associated depth information.

Item 6. The method of any of items 1-5, further wherein the altered foreground portion comprises an object being recognized, and the method further comprises determining whether one or more features of the object being recognized matches one or more features of the one or more predefined gestures in the database.

Item 7. The method of item 6, further wherein the altered foreground portion matches the one or more predefined gestures in the database when a threshold of similarity between a feature of the object being recognized and a corresponding feature of the one or more predefined gestures is calculated.

Item 8. The method of any of items 6-7, further wherein the object being recognized is a user's hand, and the recognized gesture is a hand gesture.

Item 9. The method of any of items 6-8, further wherein the one or more features of the object being recognized comprises at least one of a depth of each pixel of the object being recognized, a contour, a convex hull point, and a geometrical carter of the object being recognized.

Item 10. The method of any of items 1-8, wherein determining whether the one or more subsequent video frames matches the one or more predefined gestures in the database to produce the recognized gesture further comprises:
capturing, at the camera system, a second video frame and depth information associated with the subsequent video frame;
identifying a foreground portion of the second video frame based on the depth information;
modifying the second video frame by altering a color mode of the second foreground portion; and
determining whether the recognized gesture is produced based on the altered foreground portion and the second altered foreground portion.

Item 11. The method of item 10, further wherein the recognized gesture is produced when the altered foreground portion and the second altered foreground portion correspond to a sequence of predefined gestures in the gestures database.

Item 12. A computer readable storage medium storing one or more programs, the one or more programs comprising instructions, which when executed by an electronic device with a camera system, cause the device to perform any of the methods of items 1-11.

Item 13. An electronic device, comprising:
a camera system;
one or more processors;
memory; and
one or more programs, wherein the one or more programs are stored in the memory and configured to be executed by the one or more processors, the one or more programs including instructions for performing any of the methods of items 1-11.

Item 14. An electronic device, comprising:
a camera system; and
means for performing any of the methods of items 1-11.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which may be readily separated from or combined with the features of any of the other several embodiments without departing from the scope or spirit of the various embodiments. Moreover, use of terms such as first, second, third, etc., do not necessarily denote any ordering or importance, but rather are used to distinguish one element from another.

What is claimed is:

1. A method for gesture recognition based on depth information from a camera, comprising:
at an electronic device having a camera system:
capturing, at the camera system, a video frame and depth information associated with the video frame;

identifying a foreground portion of the video frame based on the depth information;

modifying the video frame by altering a color mode of the foreground portion;

determining whether the altered foreground portion matches one or more predefined gestures in a database; and in accordance with a determination that the altered foreground portion matches the one or more predefined gestures in the database, determining whether one or more subsequent video frames matches the one or more predefined gestures in the database to produce a recognized gesture.

2. The method of claim 1, wherein altering the color mode of the foreground portion further comprises converting the foreground portion to gray scale.

3. The method of claim 1, wherein modifying the video frame further comprises eliminating a background portion of the video frame that is not included in the identified foreground portion of the video frame.

4. The method of claim 1, further wherein identifying the foreground portion comprises identifying pixels of the video frame that are within a threshold distance X based on the associated depth information.

5. The method of claim 1, further comprising:

identifying a background portion of the video frame by identifying pixels of the video frame that are not within a threshold distance X based on the associated depth information.

6. The method of claim 1, further wherein the altered foreground portion comprises an object being recognized, and the method further comprises determining whether one or more features of the object being recognized matches one or more features of the one or more predefined gestures in the database.

7. The method of claim 6, further wherein the altered foreground portion matches the one or more predefined gestures in the database when a threshold of similarity between a feature of the object being recognized and a corresponding feature of the one or more predefined gestures is calculated.

8. The method of claim 6, further wherein the object being recognized is a user's hand, and the recognized gesture is a hand gesture.

9. The method of claim 6, further wherein the one or more features of the object being recognized comprises at least one of a depth of each pixel of the object being recognized, a contour, a convex hull point, and a geometrical carter of the object being recognized.

10. The method of claim 1, wherein determining whether the one or more subsequent video frames matches the one or more predefined gestures in the database to produce the recognized gesture further comprises:

capturing, at the camera system, a second video frame and depth information associated with the subsequent video frame;

identifying a foreground portion of the second video frame based on the depth information;

modifying the second video frame by altering a color mode of the second foreground portion; and determining whether the recognized gesture is produced based on the altered foreground portion and the second altered foreground portion.

11. The method of claim 10, further wherein the recognized gesture is produced when the altered foreground portion and the second altered foreground portion correspond to a sequence of predefined gestures in the gestures database.

12. A computer readable storage medium storing one or more programs, the one or more programs comprising instructions, which when executed by an electronic device with a camera system, cause the device to:

capture, at the camera system, a video frame and depth information associated with the video frame;

identify a foreground portion of the video frame based on the depth information;

modify the video frame by altering a color mode of the foreground portion;

determine whether the altered foreground portion matches one or more predefined gestures in a database; and in accordance with a determination that the altered foreground portion matches the one or more predefined gestures in the database, determine whether one or more subsequent video frames matches the one or more predefined gestures in the database to produce a recognized gesture.

13. An electronic device, comprising:

a camera system;

one or more processors;

memory; and one or more programs, wherein the one or more programs are stored in the memory and configured to be executed by the one or more processors, the one or more programs including instructions for capturing, at the camera system, a video frame and depth information associated with the video frame;

identifying a foreground portion of the video frame based on the depth information;

modifying the video frame by altering a color mode of the foreground portion;

determining whether the altered foreground portion matches one or more predefined gestures in a database; and in accordance with a determination that the altered foreground portion matches the one or more predefined gestures in the database, determining whether one or more subsequent video frames matches the one or more predefined gestures in the database to produce a recognized gesture.

14. An electronic device, comprising:

a camera system; and means for capturing, at the camera system, a video frame and depth information associated with the video frame;

means for identifying a foreground portion of the video frame based on the depth information;

means for modifying the video frame by altering a color mode of the foreground portion;

means for determining whether the altered foreground portion matches one or more predefined gestures in a database; and means for, in accordance with a determination that the altered foreground portion matches the one or more predefined gestures in the database, determining whether one or more subsequent video frames matches the one or more predefined gestures in the database to produce a recognized gesture.

* * * * *